US009499653B2

(12) United States Patent
Strobel et al.

(10) Patent No.: US 9,499,653 B2
(45) Date of Patent: *Nov. 22, 2016

(54) CURING AGENTS FOR EPOXY RESINS

(75) Inventors: Sylvia Strobel, Garching (DE); Martin Ebner, Kissing (DE); Hans-Peter Krimmer, Kirchweidach (DE); Michaela Huber, Markt Schwaben (DE)

(73) Assignee: ALZCHEM AG, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,935

(22) PCT Filed: Feb. 23, 2012

(86) PCT No.: PCT/EP2012/053092
§ 371 (c)(1),
(2), (4) Date: Aug. 6, 2013

(87) PCT Pub. No.: WO2012/113879
PCT Pub. Date: Aug. 30, 2012

(65) Prior Publication Data
US 2013/0323429 A1  Dec. 5, 2013

(30) Foreign Application Priority Data

Feb. 23, 2011 (DE) .................. 10 2011 012 079
Jan. 17, 2012 (DE) .................. 10 2012 000 674

(51) Int. Cl.
| C09K 3/00 | (2006.01) |
| B05D 3/00 | (2006.01) |
| C08G 18/06 | (2006.01) |
| C08G 59/46 | (2006.01) |
| C08G 59/40 | (2006.01) |
| C08L 63/00 | (2006.01) |
| C08L 75/04 | (2006.01) |

(52) U.S. Cl.
CPC ........... *C08G 18/06* (2013.01); *C08G 59/4021* (2013.01); *C08G 59/46* (2013.01); *C08L 63/00* (2013.01); *C08L 75/04* (2013.01)

(58) Field of Classification Search
CPC .................. C08G 59/46; C08G 18/06; C08G 59/4021; C08L 63/00; C08L 75/04
USPC .......... 525/523; 427/444; 252/182.26, 182.28
See application file for complete search history.

(56) References Cited

U.S. PATENT DOCUMENTS

| 3,624,178 A | 11/1971 | Lohse et al. |
| 4,126,664 A | 11/1978 | Weiss |
| 4,562,289 A | 12/1985 | Hajek et al. |
| 4,670,533 A | 6/1987 | Lauterbach |
| 4,677,170 A | 6/1987 | Monnier et al. |
| 4,912,190 A | 3/1990 | Schafer et al. |
| 4,933,422 A | 6/1990 | Hammer |
| 5,407,977 A | 4/1995 | Everett et al. |
| 5,424,373 A | 6/1995 | Flury et al. |
| 5,429,831 A | 7/1995 | Williams et al. |
| 5,512,372 A | 4/1996 | Blanc et al. |
| 5,620,831 A | 4/1997 | Kawana |
| 6,410,127 B1 | 6/2002 | Sawaoka et al. |
| 2004/0147711 A1 | 7/2004 | Christiansen et al. |
| 2006/0106168 A1 | 5/2006 | Ota et al. |
| 2007/0027274 A1 | 2/2007 | Antelmann et al. |
| 2008/0081170 A1 | 4/2008 | Tilbrook et al. |
| 2012/0208925 A1 | 8/2012 | Hitzler et al. |
| 2013/0079488 A1 | 3/2013 | Hitzler et al. |
| 2014/0024741 A1 | 1/2014 | Strobel et al. |
| 2015/0158970 A1 | 6/2015 | Strobel et al. |
| 2015/0158972 A1 | 6/2015 | Strobel et al. |
| 2016/0083580 A1 | 3/2016 | Strobel et al. |

FOREIGN PATENT DOCUMENTS

| AT | 351772 | 8/1979 | |
| AU | 705375 | 5/1999 | |
| CA | 2145590 | 9/1995 | |
| CA | 2816725 A1 | 8/2012 | |
| CA | 2827002 A1 | 8/2012 | |
| CN | 1513893 | 7/2004 | |
| CN | 1717427 | 5/2006 | |
| CN | 1798787 | 2/2007 | |
| CN | 101215453 | 7/2008 | |
| CN | 101240154 | 8/2008 | |
| DE | 2459752 | 7/1976 | |
| DE | 2743015 | 4/1979 | |
| DE | 3540524 | 5/1987 | |
| DE | 4026363 | 3/1992 | |
| DE | 69613479 | 4/2002 | |
| DE | 69331759 | 1/2003 | |
| DE | 102006012550 | 9/2007 | |
| DE | 102006012550 A1 * | 9/2007 | ............. C08G 59/44 |
| DE | 102009052061 | 5/2011 | |
| DE | 102010020882 | 11/2011 | |
| DE | 102011012079 | 8/2012 | |
| EP | 0108712 | 5/1984 | |
| EP | 0196077 | 10/1986 | |
| EP | 0204658 | 12/1986 | |

(Continued)

OTHER PUBLICATIONS

Hitzler et al., DE 102006012550 A1 machine translation in English, Sep. 20, 2007.*
"Scifinder Cyanamide Properties," American Chemical Society, 2014, 3 pages.
U.S. Appl. No. 14/000,992, "Non-Final Office Action", Oct. 29, 2013, 25 pages.
International Search Report dated Jun. 8, 2012 in PCT Application No. PCT/EP2012/053092.
German Patent Application No. DE102012015315.5, Search Report dated Apr. 4, 2013.

(Continued)

*Primary Examiner* — David Karst
(74) *Attorney, Agent, or Firm* — Kilpatrick Townsend & Stockton LLP

(57) ABSTRACT

The present invention relates to new mixtures containing cyanamide and a urea derivative, to liquid curing agents for curing polymer resins, in particular epoxy resins, and to epoxy resin compositions comprising liquid curing agents for producing fibre composite materials.

27 Claims, No Drawings

(56) References Cited

FOREIGN PATENT DOCUMENTS

| | | |
|---|---|---|
| EP | 0429395 | 5/1991 |
| EP | 0639599 | 2/1995 |
| EP | 0658584 | 6/1995 |
| EP | 0675143 | 1/2002 |
| EP | 1996641 | 10/2009 |
| GB | 2247237 | 2/1992 |
| JP | 60069126 A | 4/1985 |
| WO | 2004050739 | 6/2004 |
| WO | 2004106402 | 12/2004 |
| WO | 2007062853 | 6/2007 |
| WO | 2007107288 | 9/2007 |
| WO | 2007107288 A1 | 9/2007 |
| WO | 2011054945 | 5/2011 |
| WO | 2011134168 | 11/2011 |
| WO | 2011144659 | 11/2011 |
| WO | 2012113878 | 8/2012 |
| WO | 2012113879 A1 | 8/2012 |

OTHER PUBLICATIONS

German Patent Application No. DE102012015316.3, Search Report dated Apr. 4, 2013.
International Patent Application No. PCT/EP2013/066078, International Search Report mailed Mar. 27, 2014, 7 pages.
International Patent Application No. PCT/EP2013/066102, International Search Report mailed Mar. 31, 2014, 7 pages.
Non-Final Office Action in U.S. Appl. No. 14/000,992 mailed Oct. 29, 2014, 25 pages.
Response to Non-Final Office Action in U.S. Appl. No. 14/000,992, filed Feb. 2, 2015, 30 pages.
Huang et al. (1989) Studies on the Characterization of Ureas as Latent Accelerators for Dicyandiamide-Cured Epoxy Resin, ACTA Polymerica Sinica; 3, 329-336.
U.S. Appl. No. 14/955,828, "Non-Final Office Action", Jan. 15, 2016, 41 pages.
Office Action in related Japanese Application No. 2013-554899, Aug. 19, 2015, 2 pages.
U.S. Appl. No. 14/000,992, "Final Office Action", dated Jun. 10, 2015, 35 pages.
International Application No. PCT/EP2013/066102, English Translation of International Preliminary Report on Patentability dated Feb. 2, 2015.
International Application No. PCT/EP2013/066078, English Translation of International Preliminary Report on Patentability dated Feb. 12, 2015.
U.S. Appl. No. 14/418,227, "Notice of Allowance", mailed Mar. 28, 2016, 21 pages.
U.S. Appl. No. 14/000,992, "Notice of Allowance", Dec. 9, 2015, 10 pages.
U.S. Appl. No. 14/407,232, "Non-Final Office Action", Dec. 4, 2015, 54 pages.
U.S. Appl. No. 14/418,227, "Non-Final Office Action", Dec. 7, 2015, 23 pages.
Chinese Patent Application No. 201380029718.7, English translation of Office Action dated Feb. 26, 2016.
U.S. Appl. No. 14/407,232, Notice of Allowance, mailed Sep. 14, 2016, 35 pages.
U.S. Appl. No. 14/955,828, Non-Final Office Action, mailed Sep. 26, 2016, 34 pages.

* cited by examiner

CURING AGENTS FOR EPOXY RESINS

PRIOR RELATED APPLICATIONS

This application is a National Phase application of International Application No. PCT/EP2012/053092 filed Feb. 23, 2012, which claims priority to German Patent Application No. 10 2011 012 079.3 filed Feb. 23, 2011, and German Patent Application No. 10 2012 000 674.8 filed Jan. 17, 2012, each of which is incorporated herein by reference in its entirety.

The present invention relates to new mixtures, containing cyanamide and at least one urea derivative, to liquid curing agents for curing epoxy resins and to epoxy resin compositions comprising liquid curing agents for producing fibre composite materials.

The use of thermosetting epoxy resins is widespread owing to the good chemical resistance, the very good thermal and dynamic-mechanical properties and the high electrical insulating capacity thereof. Furthermore, epoxy resins demonstrate good adhesion to many substrates and are thus very well suited to use in fibre composite materials (composites). For use in fibre composite materials, both good wetting of the fibres, that is to say a low viscosity of the selected resin formulation for composite production, and good mechanical properties after curing, are desirable.

For producing shaped articles from fibre composite materials, various processes are used, such as the prepreg process, various infusion or injection processes, in this case in particular the resin transfer moulding (RTM) process. Of these processes, infusion or injection processes in particular have gained significance in recent years. In the infusion process, for example, dry reinforcing materials, such as fibre mats or non-woven, woven or knitted fabrics, are covered with a tight vacuum film and impregnated with resin formulations via distribution channels after the vacuum has been applied. These processes have the advantage that large elements having complex shapes can be moulded in a short period of time.

The epoxy resin formulation for an infusion process or an RTM process has to have a low viscosity in order to make it possible to impregnate the fibrous material under vacuum in an appropriate amount of time. The use of resin formulations of too high a viscosity or resin formulations which too rapidly produce viscosities which are too high during the injection period results in a composite exhibiting unimpregnated parts or other defects.

The curing of epoxy resins proceeds according to various mechanisms. In addition to curing using phenols or anhydrides, curing is often carried out using amines. These substances are usually liquid and can be mixed very well with epoxy resins. Owing to the high reactivity and thus very low latency, epoxy resin compositions of this type are produced as two components. This means that the resin (A component) and the curing agent (B component) are stored separately and are not mixed in the correct ratio until just before use. In this case, "latent" means that a mixture of the individual components is stable under defined storage conditions. These two-component resin formulations are also referred to as cold-curing resin formulations, the curing agents used therefor usually being selected from the group consisting of amines or amidoamines.

Single-component, hot-curing epoxy resin formulations are, however, completely prefabricated and ready to use, that is to say that the epoxy resin and the curing agent are mixed at the factory. Errors when mixing the individual components during use on site are therefore eliminated. Latent curing agent systems which do not react (can be stored) with the epoxy resin at room temperature but readily react fully when heated depending on the energy input are required therefor. Dicyandiamide, for example, is a particularly suitable and cost-effective curing agent for single-component epoxy resin formulations of this type. Corresponding resin and curing agent mixtures can be stored for up to twelve (12) months in a ready-to-use state under ambient conditions.

Unfortunately, these epoxy resin mixtures comprising highly latent dicyandiamide or other highly latent curing agents have the disadvantage that the curing agents are poorly soluble in epoxy resins, and in infusion or injection processes for producing fibre composite materials they are retained and filtered out by the fibre mats at the points of entry of the resin. Homogenous mixing of the curing agent into the resins in the composite before use is thus prevented. As a result, complete curing of the entire composite is prevented.

The problem addressed by the present invention is that of providing new substances or mixtures for curing curable polymer resins, in particular epoxy resins, which can be used for producing composites and fibre-reinforced matrices. In this case, it is further necessary for curing agents of this type to combine the advantages of the known amine curing agents and the known dicyandiamide-powder curing agents without adopting the disadvantages thereof, such as low latency or filtration of the particles. Said new curing agents are to have a sufficiently high latency in a temperature range of from 15° C. to 30° C. and make cross-linking of the epoxy resin wholly possible, are to be soluble or thoroughly miscible in epoxy resins and are to be suitable for use in infusion, injection or RTM processes.

These problems are solved by liquid curing agents according to claim 1 and liquid mixtures according to claim 7. The present invention accordingly relates to a liquid mixture as a curing agent for curing polymer resins, in particular curable polymer resins, in particular epoxy resins, containing a) cyanamide and b) at least one urea derivative of formula (I) or formula (II)

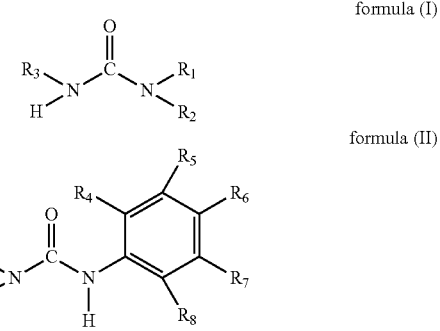

wherein the following, in each case simultaneously or independently of one another, apply to the residues and at least one residue $R^1$, $R^2$, $R^3$ is not hydrogen:

$R^1$, $R^2$, simultaneously or independently of one another, are hydrogen, C1 to C15 alkyl, C3 to C15 cycloalkyl or, together to form a ring, C3 to C10 alkylene;

$R^3$ is hydrogen, C1 to C15 alkyl, C3 to C15 cycloalkyl, aryl, aryl alkyl, C1 to C15 alkyl substituted with —NHC(O)NR$^1$R$^2$, C3 to C15 cycloalkyl substituted with —NHC(O)NR$^1$R$^2$, aryl substituted with —NHC(O)NR$^1$R$^2$ or aryl alkyl substituted with —NHC(O)NR$^1$R$^2$;

R⁴, R⁵, R⁶, R⁷, R⁸, simultaneously or independently of one another, are hydrogen, halogen, C1 to C15 alkyl, C3 to C15 cycloalkyl, aryl, aryl alkyl, —CF₃, —NHC(O)NR¹R², C1 to C15 alkyl substituted with —NHC(O)NR¹R², aryl substituted with —NHC(O)NR¹R² or aryl alkyl substituted with —NHC(O)NR¹R², which contains cyanamide and at least one urea derivative of formula (I) or formula (II) in a cyanamide:urea derivative molar ratio of 1:1 to 4:1.

It is essential to the invention here that cyanamide is always present in an equimolar quantity or a surplus of at most 4:1 relative to the total quantity of all the urea derivatives. Liquid mixtures which are suitable for use as curing agents for curing curable polymer resins, in particular epoxy resins, are only present in this ratio range.

It is essential to the invention that the composition according to the invention is liquid, since the components in the stated proportions form a eutectic mixture. The composition is thus not present in solid form and in particular not as a powder. The composition according to the invention can only be used for the infusion process or the injection process if it is in a liquid form. Surprisingly, it has been found that a eutectic mixture and thus a liquid composition can be obtained only if cyanamide and a urea derivative are in a molar ratio of 1:1 to 4:1. When using, for example, dicyanamide instead of cyanamide, a liquid mixture is not obtained.

Methyl urea or/and dimethyl urea is preferably used as a urea derivative of formula (I) or (II). The use of urea, that is to say compounds in which R¹, R² and R³ each represent hydrogen, is possible but according to the invention is less preferable.

Mixtures or curing agents which do not contain urea, that is to say a compound of formula (I) in which R₁=R₂=R₃=H, are furthermore preferred.

Surprisingly, it has been found that intensive mixing of cyanamide with urea derivatives of formula (I) or formula (II), which are as set out above, result in liquid or semi-liquid mixtures having low melting points (compared with the starting substances) which are completely soluble in or completely mix into an epoxy resin at room temperature. Although analytically separate substances are still present, DSC analyses demonstrate endothermic melting peaks of unitary systems. The action thereof in the epoxy resin is comparable to the curing properties of dicyandiamide accelerated by imidazoles and takes place at <100° C. Nevertheless, at room temperature, a latency of several days to several weeks is maintained. In addition, the viscosity of epoxy resins is significantly reduced, so said mixtures are especially suitable for use in infusion resins.

The present invention therefore also relates to liquid curing agents for curing polymer resins, in particular curable polymer resins, in particular epoxy resins, comprising a) cyanamide and b) at least one urea derivative of formula (I) or formula (II)

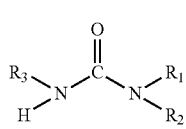

formula (I)

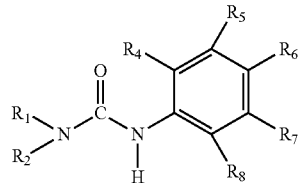

formula (II)

wherein the following, in each case simultaneously or independently of one another, apply to the residues:
R¹, R², simultaneously or independently of one another, are hydrogen, C1 to C15 alkyl, C3 to C15 cycloalkyl or, together to form a ring, C3 to C10 alkylene;
R³ is hydrogen, C1 to C15 alkyl, C3 to C15 cycloalkyl, aryl, aryl alkyl, C1 to C15 alkyl substituted with —NHC(O)NR¹R², C3 to C15 cycloalkyl substituted with —NHC(O)NR¹R², aryl substituted with —NHC(O)NR¹R² or aryl alkyl substituted with —NHC(O)NR¹R²;
R⁴, R⁵, R⁶, R⁷, R⁸, simultaneously or independently of one another, are hydrogen, halogen, C1 to C15 alkyl, C3 to C15 cycloalkyl, aryl, aryl alkyl, —CF₃, —NHC(O)NR¹R², C1 to C15 alkyl substituted with —NHC(O)NR¹R², aryl substituted with —NHC(O)NR¹R² or aryl alkyl substituted with —NHC(O)NR¹R², which comprise cyanamide and at least one urea derivative of formula (I) or formula (II) in a cyanamide:urea derivative molar ratio of 1:1 to 4:1.

It is essential to the invention here that cyanamide is always present in an equimolar quantity or a surplus of at most 4:1 relative to the total quantity of all the urea derivatives. Liquid curing agents for curing curable polymer resins, in particular epoxy resins, which are particularly suitable for use in composites, are only present in this ratio range.

In particular it is provided according to the present invention that the cyanamide:urea derivative molar ratio is 1:1 to 3:1, more preferably 1:1 to 2:1 and most preferably 2:1 to 4:1.

In this case, a liquid mixture or a liquid curing agent according to the invention is understood to be a mixture or a curing agent which has a melting point $S_m$ where $S_m < 20°$ C. (normal pressure) or is present as a liquid at a temperature of 20° C. (normal pressure) and has a viscosity of less than 1 Pa*s. The liquid mixtures or curing agents according to the invention preferably have a viscosity of ≤100 mPa*s, more preferably of <20 mPa*s and more preferably still of ≤12 mPa*s at 25° C. However, those liquid mixtures or liquid curing agents which have a melting point $S_m$ where $S_m < 10°$ C. (normal pressure), more preferably a melting point $S_m$ where $S_m < 0°$ C. (normal pressure), or which are present as a fluid at a temperature of 10° C. (normal pressure), more preferably at a temperature of 0° C. (normal pressure), and which have a viscosity of less than 1 Pa*s are particularly preferred.

It is to be emphasised here that said curing agents or mixtures are liquid per se and in particular do not comprise any solvents or solubilisers apart from cyanamide and at least one urea derivative, and are thus solvent-free or solubiliser-free. In conjunction with the present invention, a solvent or solubiliser is understood to be any inorganic or organic solvent or solubiliser or mixture thereof which is used in chemical synthesis or in analytical chemistry for producing a solution. In conjunction with the present invention, solvent-free or solubiliser-free means a mixture or curing agent which is substantially free of solvents or solubilisers and, as required by production, contains at most 1.0% by weight, in particular at most 0.7% by weight, in particular at most 0.5% by weight solvent or solubiliser and more preferably contains less than 0.1% by weight and most preferably no solvent or solubiliser.

Also in conjunction with the present invention, C1 to C15 alkyl is understood to be a linear or branched alkyl residue which has the general formula $C_nH_{2n+1}$, where n=1 to 15. In this case, it is in particular provided that C1 to C15 alkyl is methyl, ethyl, propyl, butyl, pentyl, hexyl, heptyl, octyl, nonyl or decyl, it being possible for said alkyl residues furthermore to preferably also be unbranched, one-branched, multi-branched or alkyl-substituted.

C1 to C15 alkyl residues of this type which in turn are monosubstituted or polysubstituted with C1 to C5 alkyl are preferred. C1 to C5 alkyl according to the present invention can be methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl or 1-ethylpropyl. According to the present invention, alkyl can in particular also be 1-methylethyl, 1-methylpropyl, 1-methylbutyl, 1-methylpentyl, 1-methylhexyl, 1-methylheptyl, 1-methyloctyl, 1-methylnonyl, 1-methyldecanyl, 1-ethylpropyl, 1-ethylbutyl, 1-ethylpentyl, 1-ethylhexyl, 1-ethylheptyl, 1-ethyloctyl, 1-ethylnonyl, 1-ethyldecanyl, 2-methylpropyl, 2-methylbutyl, 2-methylpentyl, 2-methylhexyl, 2-methylheptyl, 2-methyloctyl, 2-methylnonyl, 2-methyldecanyl, 2-ethylpropyl, 2-ethylbutyl, 2-ethylpentyl, 2-ethylhexyl, 2-ethylheptyl, 2-ethyloctyl, 2-ethylnonyl, 2-ethyldecanyl, 1,1-dimethylethyl, 1,1-dimethylpropyl, 1,1-dimethylbutyl, 1,1-dimethylpentyl, 1,1-dimethylhexyl, 1,1-dimethylheptyl, 1,1-dimethyloctyl, 1,1-dimethylnonyl, 1,1-dimethyldecanyl, 1,2-dimethylpropyl, 1,2-dimethylbutyl, 1,2-dimethylpentyl, 1,2-dimethylhexyl, 1,2-dimethylheptyl, 1,2-dimethyloctyl, 1,2-dimethylnonyl, 1,2-dimethyldecanyl, 2-ethyl-1-methylbutyl, 2-ethyl-1-methylpentyl, 2-ethyl-1-methylhexyl, 2-ethyl-1-methylheptyl, 2-ethyl-1-methyloctyl, 2-ethyl-1-methylnonyl, 2-ethyl-1-methyldecanyl, 1-ethyl-2-methylpropyl, 1-ethyl-2-methylbutyl, 1-ethyl-2-methylpentyl, 1-ethyl-2-methylhexyl, 1-ethyl-2-methylheptyl, 1-ethyl-2-methyloctyl, 1-ethyl-2-methylnonyl or 1-ethyl-2-methyldecanyl.

A C1 to C15 alkyl residue, in particular methyl, ethyl, propyl, butyl, can further preferably in turn also be substituted with a C3 to C15 cycloalkyl residue, C3 to C15 cycloalkyl being as set out below. C1 to C15 alkyl can thus in particular also be C3 to C15 cycloalkyl methyl, 1-(C3 to C15 cycloalkyl)-1-ethyl, 2-(C3 to C15 cycloalkyl)-1-ethyl, 1-(C3 to C15 cycloalkyl)-1-propyl, 2-(C3 to C15 cycloalkyl)-1-propyl or 3-(C3 to C15 cycloalkyl)-1-propyl, C3 to C15 cycloalkyl being as set out below.

In conjunction with the present invention, C3 to C15 cycloalkyl is understood to be a monocyclic or bicyclic cycloalkyl residue having 3 to 15 carbon atoms, in particular a cycloalkyl residue which has the general formula $C_nH_{2n-1}$, where n=3 to 15. C3 to C15 cycloalkyl can further preferably be cyclopropyl, cyclobutyl, cyclopentyl, cyclohexyl oder cycloheptyl, it being possible for said cycloalkyl residues in turn to further preferably be monosubstituted or polysubstituted with C1 to C5 alkyl residues, which are as set out above. C3 to C15 cycloalkyl can thus further preferably also be 1-methyl-1-cyclopropyl, 1-methyl-1-cyclobutyl, 1-methyl-1-cyclopentyl, 1-methyl-1-cyclohexyl, 1-methyl-1-cycloheptyl, 2-methyl-1-cyclopropyl, 2-methyl-1-cyclobutyl, 2-methyl-1-cyclopentyl, 2-methyl-1-cyclohexyl, 2-methyl-1-cycloheptyl, 3-methyl-1-cyclobutyl, 3-methyl-1-cyclopentyl, 3-methyl-1-cyclohexyl, 3-methyl-1-cycloheptyl, 4-methyl-1-cyclohexyl, 4-methyl-1-cycloheptyl, 1,2-dimethyl-1-cyclopropyl, 2,2-dimethyl-1-cyclopropyl, 2,3-dimethyl-1-cyclopropyl, 1,2-dimethyl-1-cyclobutyl, 1,3-dimethyl-1-cyclobutyl, 2,2-dimethyl-1-cyclobutyl, 2,3-dimethyl-1-cyclobutyl, 2,4-dimethyl-1-cyclobutyl, 3,3-dimethyl-1-cyclobutyl, 1,2-dimethyl-1-cyclopentyl, 1,3-dimethyl-1-cyclopentyl, 2,2-dimethyl-1-cyclopentyl, 2,3-dimethyl-1-cyclopentyl, 2,4-dimethyl-1-cyclopentyl, 2,5-dimethyl-1-cyclopentyl, 3,3-dimethyl-1-cyclopentyl, 3,4-dimethyl-1-cyclopentyl, 1,2-dimethyl-1-cyclohexyl, 1,3-dimethyl-1-cyclohexyl, 1,4-dimethyl-1-cyclohexyl, 1,5-dimethyl-1-cyclohexyl, 1,6-dimethyl-1-cyclohexyl, 2,2-dimethyl-1-cyclohexyl, 2,3-dimethyl-1-cyclohexyl, 2,4-dimethyl-1-cyclohexyl, 2,5-dimethyl-1-cyclohexyl, 2,6-dimethyl-1-cyclohexyl, 3,3-dimethyl-1-cyclohexyl, 3,4-dimethyl-1-cyclohexyl, 3,5-dimethyl-1-cyclohexyl, 3,6-dimethyl-1-cyclohexyl, 4,4-dimethyl-1-cyclohexyl, 1,2,2-trimethyl-1-cyclopropyl, 1,2,3-trimethyl-1-cyclopropyl, 1,2,2-trimethyl-1-cyclobutyl, 1,3,3-trimethyl-1-cyclobutyl, 1,2,3-trimethyl-1-cyclobutyl, 2,2,3-trimethyl-1-cyclobutyl, 2,2,4-trimethyl-1-cyclobutyl, 1,2,2-trimethyl-1-cyclopentyl, 1,2,3-trimethyl-1-cyclopentyl, 1,2,4-trimethyl-1-cyclopentyl, 1,2,5-trimethyl-1-cyclopentyl, 1,3,3-trimethyl-1-cyclopentyl, 1,3,4-trimethyl-1-cyclopentyl, 1,3,5-trimethyl-1-cyclopentyl, 2,2,3-trimethyl-1-cyclopentyl, 2,2,4-trimethyl-1-cyclopentyl, 2,2,5-trimethyl-1-cyclopentyl, 2,3,3-trimethyl-1-cyclopentyl, 2,3,4-trimethyl-1-cyclopentyl, 2,3,5-trimethyl-1-cyclopentyl, 2,3,3-trimethyl-1-cyclopentyl, 2,4,4-trimethyl-1-cyclopentyl, 2,4,5-trimethyl-1-cyclopentyl, 2,5,5-trimethyl-1-cyclopentyl, 3,3,4-trimethyl-1-cyclopentyl, 3,3,5-trimethyl-1-cyclopentyl, 3,4,5-trimethyl-1-cyclopentyl, 3,4,4-trimethyl-1-cyclopentyl, 1,2,2-trimethyl-1-cyclohexyl, 1,2,3-trimethyl-1-cyclohexyl, 1,2,4-trimethyl-1-cyclohexyl, 1,2,5-trimethyl-1-cyclohexyl, 1,2,6-trimethyl-1-cyclohexyl, 1,3,3-trimethyl-1-cyclohexyl, 1,3,4-trimethyl-1-cyclohexyl, 1,3,5-trimethyl-1-cyclohexyl, 1,3,6-trimethyl-1-cyclohexyl, 1,4,4-trimethyl-1-cyclohexyl, 2,2,3-trimethyl-1-cyclohexyl, 2,2,4-trimethyl-1-cyclohexyl, 2,2,5-trimethyl-1-cyclohexyl, 2,2,6-trimethyl-1-cyclohexyl, 2,3,3-trimethyl-1-cyclohexyl, 2,3,4-trimethyl-1-cyclohexyl, 2,3,5-trimethyl-1-cyclohexyl, 2,3,6-trimethyl-1-cyclohexyl, 2,4,4-trimethyl-1-cyclohexyl, 2,4,5-trimethyl-1-cyclohexyl, 2,4,6-trimethyl-1-cyclohexyl, 2,5,5-trimethyl-1-cyclohexyl, 2,5,6-trimethyl-1-cyclohexyl, 2,6,6-trimethyl-1-cyclohexyl, 3,3,4-trimethyl-1-cyclohexyl, 3,3,5-trimethyl-1-cyclohexyl, 3,3,6-trimethyl-1-cyclohexyl, 3,4,4-trimethyl-1-cyclohexyl, 3,4,5-trimethyl-1-cyclohexyl, 3,4,6-trimethyl-1-cyclohexyl, 3,5,6-trimethyl-1-cyclohexyl, 1,2,3,3-tetramethyl-1-cyclopropyl, 2,2,3,3-tetramethyl-1-cyclopropyl, 1,2,2,3-tetramethyl-1-cyclopropyl, 1,2,2,3-tetramethyl-1-cyclobutyl, 1,2,3,3-tetramethyl-1-cyclobutyl, 2,2,3,3-tetramethyl-1-cyclobutyl, 2,3,3,4-tetramethyl-1-cyclobutyl, 1,2,2,3-tetramethyl-1-cyclopentyl, 1,2,2,4-tetramethyl-1-cyclopentyl, 1,2,2,5-tetramethyl-1-cyclopentyl, 1,2,3,3-tetramethyl-1-cyclopentyl, 1,2,3,4-tetramethyl-1-cyclopentyl, 1,2,3,5-tetramethyl-1-cyclopentyl, 1,2,5,5-tetramethyl-1-cyclopentyl, 2,2,3,3-tetramethyl-1-cyclopentyl, 2,2,3,3-tetramethyl-1-cyclohexyl, 2,2,4,4-tetramethyl-1-cyclohexyl, 2,2,5,5-tetramethyl-1-cyclohexyl, 3,3,4,4-tetramethyl-1-cyclohexyl, 3,3,5,5-tetramethyl-1-cyclohexyl, 1-ethyl-1-cyclopropyl, 1-ethyl-1-cyclobutyl, 1-ethyl-1-cyclopentyl, 1-ethyl-1-cyclohexyl, 1-ethyl-1-cycloheptyl, 2-ethyl-1-cyclopropyl, 2-ethyl-1-cyclobutyl, 2-ethyl-1-cyclopentyl, 2-ethyl-1-cyclohexyl, 2-ethyl-1-cycloheptyl, 3-ethyl-1-cyclobutyl, 3-ethyl-1-cyclopentyl, 3-ethyl-1-cyclohexyl, 3-ethyl-1-cycloheptyl, 4-ethyl-1-cyclohexyl or 4-ethyl-1-cycloheptyl.

According to the present invention, $R^1$ and $R^2$ can also together be C3 to C10 alkylene, $R^1$ and $R^2$ together with the nitrogen from the urea derivative forming a nitrogenous ring. In particular, it can be provided in this case that $R^1$ and $R^2$ together are ethylene, propylene, butylene, pentylene or hexylene, it being possible to optionally monosubstitute or polysubstitute said alkylene residues in turn with alkyl residues. In this case, $R^1$ and $R^2$ together with the nitrogen from the urea derivative form an aziridine, azetidine, azolidine, azinane or azepane, which in turn can be optionally monosubstituted or polysubstituted with C1 to C5 alkyl residues, which are as set out above.

According to the present invention, $—NHC(O)NR^1R^2$ is a 1-ureayl residue which is substituted with $R^1$ and $R^2$ at N3, $R^1$ and $R^2$ being as set out above.

According to the present invention, the halogen is in particular fluorine, chlorine or bromine.

According to the present invention, aryl is in particular an aromatic aryl residue having 3 to 20 carbon atoms which further preferably in turn can be (mono- or poly-) substituted with a C1 to C5 alkyl residue, which is as set out above. It can more preferably be provided that a benzene residue, naphthalene residue, anthracene residue or perylene residue be used, which itself can be monosubstituted or polysubstituted with a C1 to C5 alkyl residue, which is as set out above. Aryl is thus in particular toluoyl, xylenyl, pseudocumenyl or mesitylenyl.

According to the present invention, aryl alkyl is a C1 to C15 alkyl residue, which is as set out above, which alkyl residue is substituted with an aryl residue, which is as set out above. Aryl alkyl can in particular be a benzyl residue.

More preferably, liquid curing agents or mixtures according to the invention comprise at least one aliphatic urea derivative of formula (I). In said aliphatic urea derivatives of formula (I), $R^1$ and $R^2$ are as set out above and $R^3$ is hydrogen, C1 to C15 alkyl, C3 to C15 cycloalkyl, C1 to C15 alkyl substituted with $—NHC(O)NR^1R^2$ or C1 to C15 cycloalkyl substituted with $—NHC(O)NR^1R^2$.

More preferably, the liquid curing agents or liquid mixtures according to the invention comprise at least one urea derivative of formula (I), in which at least one of the residues $R^1$ and $R^2$ represents a methyl residue. Methylurea or N,N-dimethylurea (that is to say $R^1=R^2=$methyl and $R^3=$H) is particularly preferred.

Aliphatic urea derivatives of formula (I) are further preferred, in which $R^1$ and $R^2$ are as set out above, in particular hydrogen, methyl, ethyl, and $R^3$ is C1 to C15 cycloalkyl substituted with $—NHC(O)NR^1R^2$.

Liquid curing agents or mixtures comprising aliphatic urea derivatives of formula (III)

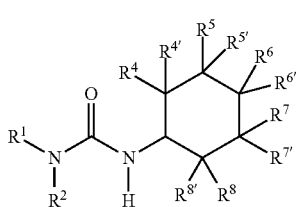

(III)

are further preferred, in which $R^1$, $R^2$, $R^4$, $R^{4'}$, $R^5$, $R^{5'}$, $R^6$, $R^{6'}$, $R^7$, $R^{7'}$ and $R^8$, $R^{8'}$ are as set out above and, in particular simultaneously or independently of one another:

$R^1$, $R^2$, simultaneously or independently of one another, are hydrogen, C1 to C15 alkyl, C3 to C15 cycloalkyl or, together to form a ring, C3 to C10 alkylene;

$R^4$, $R^{4'}$, $R^5$, $R^{5'}$, $R^6$, $R^{6'}$, $R^7$, $R^{7'}$ and $R^8$, $R^{8'}$, simultaneously or independently of one another, are hydrogen, C1 to C15 alkyl, C3 to C15 cycloalkyl, $—NHC(O)NR^1R^2$ or C1 to C15 alkyl substituted with $—NHC(O)NR^1R^2$.

Liquid curing agents or mixtures comprising aliphatic urea derivatives of formula (III) are further preferred, in which $R^1$ and $R^2$, simultaneously or independently of one another, are hydrogen or methyl, and $R^4$, $R^{4'}$, $R^5$, $R^{5'}$, $R^6$, $R^{6'}$, $R^7$, $R^{7'}$ and $R^8$, $R^{8'}$, simultaneously or independently of one another, are hydrogen, methyl, ethyl, $—NHC(O)NR^1R^2$ or methyl or ethyl substituted with $—NHC(O)NR^1R^2$. 1-(N,N-dimethylurea)-3-(N,N-dimethylureamethyl)-3,5,5-trimethyl-cyclohexane (that is to say $R^1=R^2=R^5=R^{5'}=R^7=$methyl and $R^{7'}=—CH_2—NHC(O)N(CH_3)_2$ and $R^4=R^{4'}=R^6=R^{6'}=R^{8'}=$hydrogen) is particularly preferred.

However, it can also be provided that liquid curing agents or mixtures according to the present invention comprise aromatic urea derivatives of formula (II). Of these aromatic urea derivatives, urea derivatives in which the residues $R^4$, $R^5$, $R^6$, $R^7$ and $R^8$, simultaneously or independently of one another, are hydrogen, C1 to C15 alkyl, $—NHC(O)NR^1R^2$, C1 to C15 aryl substituted with $—NHC(O)NR^1R^2$ or C1 to C15 aryl alkyl substituted with $—NHC(O)NR^1R^2$, are particularly preferred.

Liquid curing agents or mixtures comprising urea derivatives of formula (IV)

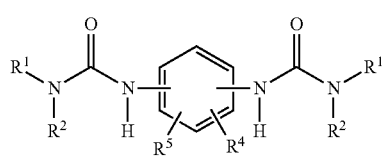

(IV)

are particularly preferred, in which $R^1$, $R^2$, $R^4$ and $R^5$ are as set out above and, in particular simultaneously or independently of one another, are hydrogen, C1 to C15 alkyl. The residues $R^1$ and $R^2$ are preferably a methyl residue in conjunction with formula (IV). 1,1'-(4-methyl-m-phenylene)-bis-(3,3-dimethylurea) and 1,1'-(2-methyl-m-phenylene)-bis-(3,3-dimethylurea) (that is to say $R^1=R^2=R^5$ is methyl and $R^4$ is hydrogen) are particularly preferred.

According to a further embodiment, it can be provided in particular that the liquid curing agents according to the invention for curing epoxy resins contain a) cyanamide and b) at least one urea derivative of formula (I) or formula (II) having the residues as set out above, said curing agents containing cyanamide and at least one urea derivative of formula (I) or formula (II) in a cyanamide:urea derivative molar ratio of 1:1 to 4:1. Liquid curing agents which contain cyanamide and two different urea derivatives of formula (I), formula (II) or of formula (I) and formula (II) are particularly preferred, said curing agents containing cyanamide and two different urea derivatives of formula (I), formula (II) or of formula (I) and formula (II) in a cyanamide:urea derivative molar ratio of 1:1 to 4:1.

Liquid curing agents which contain a urea derivative of formula (I) or formula (II) are particularly suitable, wherein, simultaneously or independently of one another, the residues $R^1$, $R^2$ are methyl or ethyl.

Liquid curing agents which contain a urea derivative of formula (I) are in particular suitable, wherein the following, simultaneously or independently of one another, apply to the residues:

$R^1$, $R^2$, simultaneously or independently of one another, are hydrogen, C1 to C15 alkyl, $R^3$ is hydrogen, C1 to C15 alkyl, C3 to C15 cycloalkyl, C1 to C15 alkyl substituted with —NHC(O)NR$^1$R$^2$, C3 to C15 cycloalkyl substituted with —NHC(O)NR$^1$R$^2$, or aryl substituted with —NHC(O)NR$^1$R$^2$.

According to a further particularly preferred configuration of the invention, the invention relates to liquid curing agents which comprise cyanamide and at least one urea derivative selected from the group consisting of urea, 1,1-dimethylurea, 3-(3-chloro-4-methylphenyl)-1,1-dimethylurea, 3-(p-chlorophenyl)-1,1-dimethylurea, 3-phenyl-1,1-dimethylurea, 3-(3,4-dichlorophenyl)-1,1-dimethylurea, 1,1'-(methylenedi-p-phenylene)-bis-(3,3-dimethylurea), 3-(3-trifluoromethylphenyl)1,1-dimethylurea, 1,1'-(2-methyl-m-phenylene)-bis-(3,3-dimethylurea) and/or 1,1'-(4-methyl-m-phenylene)-bis-(3,3-dimethylurea) in a cyanamide to urea derivative molar ratio of 1:1 to 4:1, preferably of 1:1 to 3:1 and more preferably of 2:1 to 3:1. Liquid curing agents which contain cyanamide and at least one urea derivative from this group are particularly preferred.

Curing agents or mixtures which comprise, in particular contain, 40-70% by weight cyanamide and 30 to 60% by weight of at least one urea derivative of formula (I) and/or formula (II) or a selection as set out above.

In this case, curing agents or mixtures which comprise or contain 45-70% by weight, in particular 45-60% by weight and more preferably 45 to 55% by weight cyanamide, are particularly preferred.

Simultaneously or independently thereof, mixtures or curing agents according to the invention can comprise, in particular contain, in particular 35-60% by weight, in particular 35-55% by weight and more preferably 45 to 55% by weight of at least one urea derivative of formula (I) and/or formula (II) or a selection as set out above.

In a development of the present invention, the present invention relates to epoxy resin compositions comprising a) at least one epoxy resin and b) at least one liquid curing agent of the above-described type.

The present invention is not subject to any restrictions with respect to the epoxy resins to be cured. Any commercially available products which normally have more than one 1,2 epoxy group (oxirane) and can be saturated, unsaturated, aliphatic, cycloaliphatic, aromatic or heterocyclic can be used. In addition, the epoxy resins can contain substituents such as halogens, phosphorus groups and hydroxyl groups. Epoxy resins based on glycidyl polyethers of 2,2-bis(4-hydroxyphenyl)-propane (Bisphenol A) and the bromine-substituted derivative (Tetrabromobisphenol A), glycidyl polyethers of 2,2-bis(4-hydroxyphenyl)methane (Bisphenol F) and glycidyl polyethers of novolaks, and based on aniline or substituted anilines such as p-aminophenol or 4,4'-diaminodiphenylmethanes can be particularly well cured using the curing agents according to the invention.

The used quantity of liquid curing agents according to the invention is not subject to any restrictions. Preferably, however, 0.01 to 15 parts, preferably 0.1 to 15 parts, preferably 0.1 to 10 parts and more preferably 0.1 to 7 parts are used per 100 parts resin. A combination of a plurality of liquid curing agents according to the invention or a combination of liquid curing agents according to the invention with further co-curing agents is also covered by the present invention.

The curing of the epoxy resins using the curing agents according to the invention generally takes places at temperatures of from 10° C. to 120° C. The selection of the curing temperature is dependent on the specific processing and product requirements and can be varied in the formulation particularly by regulating the quantity of curing agent and by adding additives. In this case, the manner in which energy is supplied to the resin formulations is unimportant. For example, it can be supplied in the form of heat from an oven or heating elements, but also by means of infrared radiators or stimulation by microwaves or other radiation.

By adding further commercially available additives, as are known to a person skilled in the art for curing epoxy resins, the curing profile of the formulations according to the invention can be varied.

Additives for improving the processability of the uncured epoxy resin compositions or for adapting the thermo-mechanical properties of the thermosetting products to the requirement profile comprise, for example, reactive diluents, fillers, rheological additives such as thixotropic agents or dispersing additives, defoamers, dyes, pigments, toughness modifiers, tougheners or flame retardants.

One particular class of additives are what are known as stabilisers, which improve the storage stability and thus the latency of the curing agents according to the invention. Surprisingly, it has been found that the storage stability of the epoxy resin compositions can be improved by the addition of organic acids. In this case, in particular aromatic and non-aromatic carboxylic acids, dicarboxylic acids or tricarboxylic acids have proven to be particularly suitable as stabilisers.

According to a development, the present invention thus relates to a liquid curing agent which comprises a) cyanamide, b) at least one urea derivative of formula (I) or formula (II) and c) at least one stabiliser selected from the group consisting of organic carboxylic acids.

The present invention further relates to an epoxy resin composition which comprises a) an epoxy resin, b) at least one liquid curing agent of the above-described type and c) a stabiliser selected from the group consisting of organic carboxylic acids.

Surprisingly, it has been found that liquid curing agents according to the invention consistently initiate curing of the polymer resins at lower temperatures than powder mixtures of the same composition and thus make it possible for shaped articles to be produced in a relatively short time. In addition, the viscosity of the ready-formulated resins is reduced by the liquid curing agents according to the invention, and this in turn considerably reduces the time required for shaped article production. It should be pointed out here that the usual disadvantages of other liquid curing agents, such as a very low latency and thus very high reactivity, are not observed. In addition, the cured resins prepared using the curing agent according to the invention have higher glass transition temperatures than resins cured using amine curing agents. Conventional amine curing agents have a low latency, in particular a short processing time in resin mixtures of only approximately 3 minutes at most.

Epoxy resin formulations having the curing agents according to the invention are suitable for both manual and mechanical processing operations and in particular for producing impregnated reinforcing fibres and composites, as described, inter alia, in the publications of G. W. Ehrenstein, Faserverbund-Kunststoffe, 2006, $2^{nd}$ edition, Carl Hanser Verlag, Munich, chapter 5, page 148 et seq., and M. Reyne, Composite Solutions, 2006, JEC Publications, chapter 5, page 51 et seq. In addition to use in prepreg processes, handling in infusion and injection processes in particular is a preferred form of processing. In this case, the generally very good miscibility of the liquid curing agents according to the invention in the epoxy resins is advantageous since free-flowing infusion resins having low viscosity are required for the impregnation process (cf., inter alia, M. Reyne, Composite Solutions, 2006, JEC Publications, chapter 5, page 65; and G. W. Ehrenstein, Faserverbund-Kunststoffe, 2006, $2^{nd}$ edition, Carl Hanser Verlag, Munich, chapter 5, page 166).

The curing agents according to the invention can be used in infusion and injection processes especially because of the liquid state thereof.

The present invention thus likewise relates to the use of liquid curing agents or liquid mixtures of the above-described type for curing curable compositions. In particular, this use is directed to compositions which comprise at least one epoxy resin and/or one polyurethane resin.

Furthermore, the use of liquid mixtures or liquid curing agents of the above-described type for curing impregnated fibrous materials or impregnated woven, braided or knitted fabrics is also included in the present invention.

Owing to the advantageous properties of the curing agents according to the invention and the cost-effective production thereof, and as a result an advantageous cost-benefit ratio, said curing agents are particularly suitable for industrial use.

The following examples demonstrate the advantages of the present invention.

EXAMPLES

I. Mixtures and Curing Agents According to the Invention
1) Production of the Mixtures and Curing Agents According to the Invention Apparatus:
Laboratory dissolver (DISPERMAT type AE03-C1), 500 ml metallic dispersion vessel, dissolver disc having a diameter of 60 mm, metal spatula Method:
100 g of the individual components are weighed into a 500 ml dispersion vessel and are briefly mixed using a spatula. The mixture is stirred at the dissolver at 100-200 rpm until a thin crystalline pulp is formed. The mixture is then stirred at 500 to 2000 rpm until a temperature of 40° C. is reached. Stirring of the liquid is then continued at 100 rpm until a temperature of 25° C. is reached. The accumulated residue is filtered off. The liquid phase thus obtained is decanted and stored at room temperature (20° C.-25° C.).

Yield:
Depending on mixing, the yield is between 75 and 90%.

Raw Materials Used:
Cyanamide: AlzChem Trostberg GmbH
Urea B1: 1,1-dimethylurea—AlzChem Trostberg GmbH
Urea B2: commercial mixed isomers 1,1'-(4-methyl-m-phenylene)-bis-(3,3-dimethylurea) and 1,1'-(2-methyl-m-phenylene)-bis-(3,3-dimethylurea)—AlzChem Trostberg GmbH
Urea B3: Urea—Merck KGaA
Urea B4: 1-(N,N-dimethylurea)-3-(N,N-dimethylureamethyl)-3,5,5-trimethylcyclohexane—CAS: 39992-90-0—AlzChem Trostberg GmbH
E 828: Epikote 828 EVEL—Momentive Specialty Chemicals
RIMR 135: epoxy resin—Momentive Specialty Chemicals
RIMH 137: liquid amine curing agent—Momentive Specialty Chemicals
Vestamin IPDA: liquid amine curing agent—Evonik Degussa GmbH 2) Viscosities of the Mixtures and Curing Agents According to the Invention Determination of Viscosity:
Measurement on HAAKE Rheostress 1 carried out at 25° C. in mPa*s, having a diameter of 35 mm and 1° angle at a shear rate of 5.0 l/s (reciprocal second)

TABLE 2

| Mixture/ | Viscosity in mPa * s at given temperatures | | | | |
|---|---|---|---|---|---|
| curing agent | at 10° C. | at 15° C. | at 20° C. | at 25° C. | at 30° C. |
| H1 | 12-14 | 11-13 | 10-12 | 10-11 | 10-11 |
| H2 | 9-11 | 7-9 | 7-9 | 6-8 | 5-7 |
| H3 | — | 5-7 | 5-7 | 5-6 | 4-5 |
| H4 | 8-10 | 8-10 | 7-9 | 6-8 | 5-7 |
| H5 | 13-15 | 12-14 | 11-13 | 10-12 | 10-11 |

3) Melting Points of the Mixtures and Curing Agents According to the Invention

Determination of the melting points using DSC methods.
Measurement on Mettler Toledo DSC 822
Dyn. DSC −40° C.-60° C. at a heating rate of 10° K/min

TABLE 3

| | Melting point | |
|---|---|---|
| mixture/curing agent | first peak | second peak |
| H1 | 12-16° C. | — |
| H2 | −24--22° C. | 10-17° C. |
| H3 | −30--8° C. | 13-15° C. |

TABLE 1

Compositions of the liquid mixtures/curing agents according to the invention

| liquid mixtures/ curing agents | cyanamide | | urea B1 | | urea B2 | | urea B3 | | urea B4 |
|---|---|---|---|---|---|---|---|---|---|
| | % by weight | molar fraction | % by weight | molar fraction | % by weight | molar fraction | % by weight | molar fraction | molar fraction |
| H1 | 50 | 3 | 34 | 1 | 17 | 0.16 | — | — | — |
| H2 | 50 | 2 | 50 | 1 | — | — | — | — | — |
| H3 | 60 | 2 | — | — | — | — | 40 | 1 | — |
| H4 | 50 | 2 | — | — | 10 | 0.07 | 40 | 1 | — |
| H5 | — | 3 | — | — | — | — | — | — | 0.4 |

TABLE 3-continued

| mixture/curing agent | Melting point | |
|---|---|---|
| | first peak | second peak |
| H4 | −30--28° C. | 8-9° C. |
| H5 | 13-17° C. | — |

II. Epoxy Resin Composition According to the Invention

1) Production of Epoxy Resin Compositions 100 parts by weight epoxy resin and 7 parts by weight of the mixtures according to the invention are weighed into a 250 ml dispersion vessel and mixed at the dissolver at 500 rpm for 2 minutes. The mixture is then deaerated in a vacuum for 10 minutes.

2) Measuring Methods

Dyn-DSC: standard 30-250° C., at a heating rate of 10° K/min
Final Tg: standard Tg
  heating from 30° C. to 200° C. at 20° C./min
  maintaining at 200° C. for 10.0 min
  cooling from 200° C. to 50° C. at 20° C./min
  maintaining at 50° C. for 5.0 min
  heating from 50° C. to 200° C. at 20° C./min
  maintaining at 200° C. for 10.0 min
  cooling from 200° C. to 50° C. at 20° C./min
  maintaining at 50° C. for 5.0 min
  heating from 50° C. to 220° C. at 20° C./min
Viscosity at 25° C. in Pa*s (1° cone)
Gel time at 140° C.
Infusion tests on the heating plate at 80° C.

3) Use Test and Latencies

The advantages of the liquid mixtures/curing agents according to the invention during curing of epoxy resins in comparison with the individual additions of the comparable curing agents and accelerants as powder components can be seen in table 4.

In the liquid mixtures according to the invention, the curing consistently begins at lower temperatures than with the powder mixtures of the same compositions, the times until polymerisation (gel time at 140° C.) begins being shorter. The mixtures according to the invention significantly reduce the viscosity of the epoxy resins by up to approximately 50%, and therefore the use thereof as curing agents for infusion resin systems is recommended and the glass transition temperatures thereof are increased. The consistently higher integral quantities of heat (J/g) indicate a more spontaneous reaction of the mixtures according to the invention than the powdered individual components used as curing agents and accelerants. In addition, only half or a third of the quantity of curing agent (in comparison with known liquid amine curing agents) is required. As a result, there is a significant cost advantage.

In comparison therewith, the known and conventional liquid amine curing agents such as RIMH 137 (Momentive) or IPDA (Evonik) do demonstrate lower curing temperatures, but the mixtures according to the invention begin polymerisation in comparable times and achieve far higher glass transition temperatures.

TABLE 4

Use tests - epoxy resin composition having liquid mixtures/curing agents according to the invention versus individual additions (powder mixture - not according to the invention) with the same mix ratios (100 parts by weight epoxy resin, 7 parts by weight powder mixture or liquid curing agent respectively, unless stated otherwise)

| No. | Epoxy resin composition | Dyn DSC peak [° C.] | Dyn DSC onset [° C.] | Integral heat [J/g] | Gel time at 140° C. in min:sec | Glass transition temperature Tg [° C.] | Viscosity at 25° C. in Pa * s |
|---|---|---|---|---|---|---|---|
| E1 | E828:(powder mixture: cyanamide + B1 + B2) | 153.3 | 142.0 | 143 | 03:30 | 119 | 5.7 |
| E2 | E828:H1 | 147.0 | 135.6 | 224 | 03:10 | 121 | 5.0 |
| E3 | E828:(powder mixture: cyanamide + B1) | 144.7 | 130.0 | 339 | 04:10 | 122 | 5.5 |
| E4 | E828:H2 | 143.7 | 129.0 | 336 | 03:10 | 126 | 3.5 |
| E5 | E828:(powder mixture: cyanamide + B3) | 171.4 | 158.1 | 150 | 53:00 | 138 | n.m. |
| E6 | E828:H3 | 168.8 | 153.2 | 70 | 36:00 | 145 | 4.9 |
| E7 | E828:(powder mixture: cyanamide + B3 + B2) | 162.7 | 140.9 | 169 | 10:00 | 130 | n.m. |
| E8 | E282:H4 | 155.0 | 136.7 | 237 | 07:00 | 142 | 5.1 |
| E19 | E828:VESTAMIN IPDA 100:23 | 115.5 | 79.7 | 453 | 13:30 at 80° C. | 99 | 5.3 |
| E10 | RIMR135:RIMH137 100:30 | 125.9 | 87.9 | 436.0 | 40:00 at 80° C. | 98 | 4.1 |
| E11 | E282:H5 | 139.0 | 147.3 | 296 | 04:50 | 131 | 5.5 | n.m. = not measurable; when the powders are added individually, agglomerates form, which prevent exact viscosity measurement in the epoxy resin

TABLE 5

Latencies of the epoxy resin compositions according to table 4
in days (d) - at room temperature (19-21° C.)
(Viscosity measured at 25° C.)

| Epoxy resin composition | Start | 1 d | 2 d | 3 d | 4 d | 5 d | 6 d | 7 d | 8 d | 10 d | 11 d | 14 d |
|---|---|---|---|---|---|---|---|---|---|---|---|---|
| E1 | 5.7 | 4.8 | 4.9 | 5.8 | 7.2 | 10 | 21 | 102 | >500 | solid | — | — |
| E2 | 4.9 | 5.1 | 6.2 | 7.7 | 16 | 58 | 437 | solid | — | — | — | — |
| E3 | 5.5 | 5.6 | 5.7 | 5.8 | 14 | 14 | 14 | 21 | solid | — | — | — |
| E4 | 3.9 | 5.6 | 4.6 | 5.8 | 58 | 123 | 740 | solid | — | — | — | — |
| E5 | n.m. | n.m. | n.m. | n.m. | n.m. | n.m. | n.m. | n.m. | n.m. | n.m. | n.m. | solid |
| E6 | 4.7 | 4.8 | 3.9 | 4.5 | 4.1 | 4.5 | 4.5 | 7.9 | 32 | 73 | 500 | solid |
| E7 | n.m. | n.m. | n.m. | n.m. | n.m. | n.m. | n.m. | n.m. | n.m. | n.m. | n.m. | solid |
| E8 | 5.0 | 5.0 | 4.9 | 5.0 | 5.0 | 6.0 | 6.0 | 20 | 27 | 165 | solid | — |
| E9 | 5.3 | solid | — | — | — | — | — | — | — | — | — | — |
| E10 | 4.1 | solid | — | — | — | — | — | — | — | — | — | — |
| E11 | 5.5 | 5.5 | 5.5 | 5.5 | 5.5 | 5.5 | 5.5 | 5.5 | 5.6 | 5.7 | 6.7 | 8.0 | n.m. = not measurable; when the powders are added individually, agglomerates form, which prevent exact viscosity measurement in the epoxy resin The storage lives=latencies of curing agent/accelerant systems in epoxy resin are significantly influenced by the solubility of these systems in the resin. The relative insolubility of powdered curing agent/accelerant systems in epoxy resin at temperatures of <60° C. enables said mixtures to be stored for long periods, without the components reacting with one another.

A rapid reaction of the components with one another can be expected for mixtures of liquid curing agents/accelerants in epoxy resin, and this results in extremely restricted storage lives=latencies. This is demonstrated by the amine curing agents (RIMH 137—Momentive and Vestamin IPDA—Evonik) stated in table 5.

Surprisingly, however, the liquid mixtures/curing agents according the invention do not react rapidly with epoxy resins at room temperature, and the storage lives=latencies thereof in epoxy resins are therefore considerably longer than the conventional liquid amine curing agent systems.

TABLE 6

Infusion test with epoxy resin compositions according to table 4 - Epikote E828:
curing agent in a ratio of 100:7.0 (comparisons)

| Epoxy resin composition | Injection time in minutes | Curing time in h Temperature in ° C. | Cold Tg | Final Tg | Observations |
|---|---|---|---|---|---|
| E2 | 5 | 1 h 59-63° C.<br>5 h 69-74° C. | 72 | 128 | Fibre composite can be readily hollowed out<br>Fibre composite has a good appearance, is uniform and does not have any defects |
| E4 | 12 | 20 h 70° C. | 79 | 137 | Fibre composite can be readily hollowed out<br>Fibre composite has a good appearance, is uniform and does not have any defects |
| E6 | 45 | 6 h 80° C. | 56 | 134 | Fibre composite can be readily hollowed out<br>Fibre composite has a good appearance, is uniform and does not have any defects |
| E8 | 45 | 5.5 h 75-78° C. | 97 | 140 | Fibre composite can be readily hollowed out<br>Fibre composite has a good appearance, is uniform and does not have any defects |
| E9 | 20 | 6 h 70° C. | 93 | 99 | Fibre composite can be readily hollowed out<br>Fibre composite has a good appearance, is uniform and does not have any defects |
| E10 | 18 | 6.5 h 40° C.<br>and then<br>16 h 80° C. | 68 | 93 | Fibre composite can be readily hollowed out<br>Fibre composite has a good appearance, is uniform and does not have any defects |

TABLE 7

Fibre composite - assembly for infusion tests

| Component | Material |
| --- | --- |
| Base layer | R&G vacuum film no. 390160 |
| Seal | Tacky Tape SM5126-½" x X⅛" |
| Release film (lower) | Nylon Peel ply (plain weave 64 g/m³) offset |
| Laminate (fibreglass) | 3 layers Atlas FK 144 (296 g/m³) |
| Release film (upper) | Nylon Peel ply (plain weave 64 g/m³) offset |
| Separating film | R&G separating film no. 390190 |
| Ventilation film | R&G non-woven no. 390180 |
| Vacuum mesh | Ventilation mesh 150 g/m³ (feed direction - black) |
| Vacuum film | R&G vacuum film no. 390160 |
| Tubes (feed and discharge) | PVC, clear (3.0 mm internal diameter, 5.0 mm external diameter) |
| Substrate | Glass panel |

Mould: Heating plate
Storage vessel: Beaker
Vacuum: Standard vacuum pump (20 mbar)

Method:

Epoxy resin compositions E1-E10 are mixed and preheated in a heatable storage vessel. The feed tube is inserted and fixed into the storage vessel, the discharge tube (see assembly of an infusion test, table 7) is connected to the vacuum pump via a safety valve and the pump is switched on. The heating plate (which simulates the heatable mould) is brought to the infusion temperature. When the vacuum is applied, the epoxy resin composition is absorbed by the fibre composite. Once it is completely impregnated, the feed and discharge tubes are clamped and cut and the entire assembly now cures on the heating plate to form a laminate. Once it has completely cured and cooled, the laminate is removed from the assembly.

The powdered curing agent/accelerant systems of the individual components are unsuitable for polymerisation of the epoxy resins using the infusion process. Mixtures thereof with epoxy resin are filtered out (separated) by the fine-meshed woven fabrics at the suction points and are no longer available for curing the epoxy resins. Epoxy resin compositions E1, E3, E5 and E7 are thus not suitable for producing composites by means of infusion processes.

However, table 6 shows that the epoxy resin compositions E2, E4, E6 and E8 according to the invention, which contain the liquid curing agents H1, H2, H3 and H4 according to the invention, such as the known two-component amine systems (RIHM 137—Momentive, IPDA—Evonik), make it possible to impregnate textile fibres in accordance with the infusion process in comparable time periods. In this case, however, they generally require relatively short curing times at 80° C. and achieve considerably higher glass transition temperatures.

Furthermore, in comparison with the two-component amine systems (RIHM 137—Momentive, IPDA—Evonik), a considerably smaller quantity of curing agent is required.

The superiority of the new liquid curing agents is also demonstrated by the fact that a higher glass transition temperature (final Tg) in the composite is achieved.

The invention claimed is:

1. A liquid curing agent for curing polymer resins, comprising:

a) cyanamide; and, b) at least one urea derivative of formula (I) or formula (II)

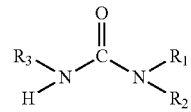
formula (I)

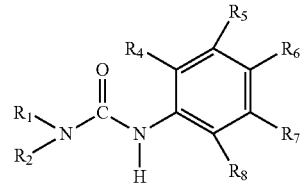
formula (II)

wherein the following, in each case simultaneously or independently of one another, apply to the residues and at least one residue $R^1R^2$, or $R^3$ is not hydrogen;

$R^1R^2$, simultaneously or independently of one another, are hydrogen, C1 to C15 alkyl or C3 to C15 cycloalkyl; or $R^1$ and $R^2$ together are C3 to C10 alkylene, thereby forming a ring;

$R^3$ is hydrogen, C1 to C15 alkyl, C3 to C15 cycloalkyl, aryl, aryl alkyl, C1 to C15 alkyl substituted with —NHC(O)NR$^1$R$^2$, C3 to C15 cycloalkyl substituted with —NHC(O)NR$^1$R$^2$, aryl substituted with —NHC(O)NR$^1$R$^2$ or aryl alkyl substituted with —NHC(O)NR$^1$R$^2$;

$R^4$, $R^5$, $R^6$, $R^7$, $R^8$, simultaneously or independently of one another, are hydrogen, C1 to C15 alkyl, C3 to C15 cycloalkyl, aryl, aryl alkyl, —CF$_3$, —NHC(O)NR$^1$R$^2$, C1 to C15 alkyl substituted with —NHC(O)NR$^1$R$^2$, aryl substituted with —NHC(O)NR$^1$R$^2$ or aryl alkyl substituted with —NHC(O)NR$^1$R$^2$;

and wherein the liquid curing agent comprises cyanamide and at least one urea derivative of formula (I) or formula (II) in a cyanamide:urea derivative molar ratio of 1:1 to 4:1, and wherein the liquid curing agent is liquid at 20-25° C.

2. The liquid curing agent of claim 1, wherein the curing agent does not comprise any solvents or solubilisers in addition to cyanamide and the at least one urea derivative, or is solvent-free or solubiliser-free.

3. The liquid curing agent of claim 1, wherein the at least one urea derivative of formula (I) or formula (II) comprises at least two different urea derivatives.

4. The liquid curing agent of claim 1, wherein the curing agent comprises a urea derivative of formula (I), wherein the following, in each case simultaneously or independently of one another, apply to the residues:

$R^1$, $R^2$ are hydrogen, or C1 to C15 alkyl;

$R^3$ is hydrogen, C1 to C15 alkyl, C3 to C15 cycloalkyl, C1 to C15 alkyl substituted with —NHC(O)NR$^1$R$^2$, C3 to C15 cycloalkyl substituted with —NHC(O)NR$^1$R$^2$, or aryl substituted with —NHC(O)NR$^1$R$^2$.

5. The liquid curing agent of claim 1, wherein the at least one urea derivative of formula (I) or formula (II) is selected from the group consisting of 1,1-dimethylurea, 3-phenyl-1,1-dimethylurea, 1,1'-(methylenedi-p-phenylene)-bis-(3,3-dimethylurea), 1,1'-(2-methyl-m-phenylene)-bis-(3,3-dimethylurea) and/or 1,1'-(4-methyl-m-phenylene)-bis-(3,3-dimethylurea).

6. An epoxy resin composition comprising:

a) at least one epoxy resin; and, b) at least one liquid curing agent of claim 1.

7. A polyurethane resin composition comprising:
a) at least one polyurethane resin; and,
b) at least one liquid curing agent of claim 1.

8. A method of curing a composition comprising at least one epoxy resin comprising curing the composition with liquid curing agent of claim 1.

9. A method of curing a composition comprising at least one polyurethane resin comprising curing the composition with liquid curing agent of claim 1.

10. A method of curing a composition comprising an impregnated fibrous material, an impregnated woven fabric, an impregnated kitted fabric, or an impregnated braided fabric comprising curing the composition with liquid curing agent of claim 1.

11. The liquid curing agent of claim 1, wherein the polymer resins are epoxy resins.

12. The liquid curing agent of claim 1, wherein the liquid curing agent has a melting point $S_m$ of <20° C. at normal pressure.

13. The liquid curing agent of claim 12, wherein the liquid curing agent is liquid at a temperature of 20° C. at normal pressure and has a viscosity of less than 1 Pa*s.

14. A liquid curing agent for curing polymer resins, consisting essentially of:
a) cyanamide; and,
b) at least one urea derivative of formula (I) or formula (II)

15. The liquid curing agent of claim 14, wherein the curing agent does not comprise any solvents or solubilisers in addition to cyanamide and the at least one urea derivative, or is solvent-free or solubiliser-free.

16. An epoxy resin composition comprising:
a) at least one epoxy resin; and,
b) at least one liquid curing agent of claim 14.

17. A polyurethane resin composition comprising:
a) at least one polyurethane resin; and,
b) at least one liquid curing agent of claim 14.

18. The liquid curing agent of claim 14, wherein the polymer resins are epoxy resins.

19. The liquid curing agent of claim 14, wherein the liquid curing agent has a melting point $S_m$ of <20° C. at normal pressure.

20. The liquid curing agent of claim 14, wherein the liquid curing agent is liquid at a temperature of 20° C. at normal pressure and has a viscosity of less than 1 Pa*s.

21. A liquid curing agent for curing polymer resins, comprising:
(a) cyanamide; and
(b) at least one urea derivative of formula (III) or formula (IV)

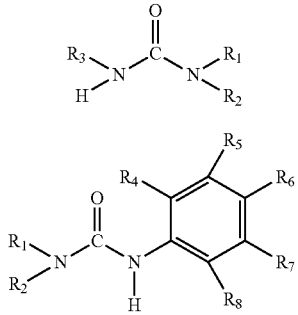

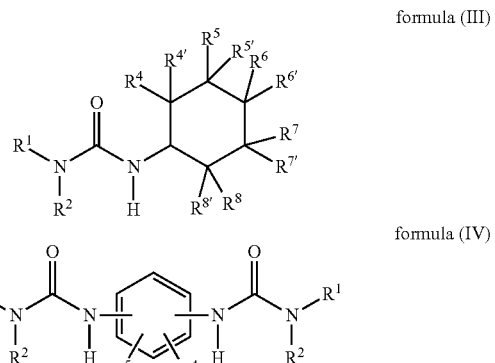

wherein the following, in each case simultaneously or independently of one another, apply to the residues and at least one residue $R^1$, $R^2$, or $R^3$ is not hydrogen;
$R^1$, $R^2$, simultaneously or independently of one another, are hydrogen, C1 to C15 alkyl or C3 to C15 cycloalkyl; or $R^1$ and $R^2$ together are C3 to C10 alkylene, thereby forming a ring;
$R^3$ is hydrogen, C1 to C15 alkyl, C3 to C15 cycloalkyl, aryl, aryl alkyl, C1 to C15 alkyl substituted with —NHC(O)NR$^1$R$^2$, C3 to C15 cycloalkyl substituted with —NHC(O)NR$^1$R$^2$, aryl substituted with —NHC(O)NR$^1$R$^2$ or aryl alkyl substituted with —NHC(O)NR$^1$R$^2$;
$R^4$, $R^5$, $R^6$, $R^7$, $R^8$, simultaneously or independently of one another, are hydrogen, C1 to C15 alkyl, C3 to C15 cycloalkyl, aryl, aryl alkyl, —CF$_3$, —NHC(O)NR$^1$R$^2$, C1 to C15 alkyl substituted with —NHC(O)NR$^1$R$^2$, aryl substituted with —NHC(O)NR$^1$R$^2$ or aryl alkyl substituted with —NHC(O)NR$^1$R$^2$,
wherein the liquid curing agent comprises cyanamide and at least one urea derivative of formula (I) or formula (II) in a cyanamide : urea derivative molar ratio of 1:1 to 4:1, and wherein the curing agent is liquid at 20-25° C.

wherein the following, in each case simultaneously or independently of one another, apply to the residues:
$R^1$, $R^2$, simultaneously or independently of one another, are hydrogen, C1 to C15 alkyl or C3 to C15 cycloalkyl; or $R^1$ and $R^2$ together are C3 to C10 alkylene, thereby forming a ring;
$R^4$, $R^{4'}$, $R^5$, $R^{5'}$, $R^6$, $R^{6'}$, $R^7$, $R^{7'}$, $R^8$, $R^{8'}$ simultaneously or independently of one another, are hydrogen, halogen, C1 to C15 alkyl, C3 to C10 cycloalkyl, aryl, aryl alkyl, —CF$_3$, —NHC(O)NR$^1$R$^2$ or C1 to C15 alkyl substituted with —NHC(O)NR$^1$R$^2$, aryl substituted with —NHC(O)NR$^1$R$^2$ or aryl alkyl substituted with —NHC(O)NR$^1$R$^2$,
wherein the liquid mixture comprises cyanamide and at least one urea derivative of formula (III) or formula (IV) in a cyanamide : urea derivative molar ratio of 1:1 to 4:1,
and wherein the liquid curing agent is liquid at 20-25° C.

22. The liquid curing agent of claim 21, wherein the curing agent does not comprise any solvents or solubilisers in addition to cyanamide and the at least one urea derivative, or is solvent-free or solubiliser-free.

23. An epoxy resin composition comprising:
a) at least one epoxy resin; and, b) at least one liquid curing agent of claim 21.

24. A polyurethane resin composition comprising:
a) at least one polyurethane resin; and, b) at least one liquid curing agent of claim 21.

25. The liquid curing agent of claim 21, wherein the polymer resins are epoxy resins.

26. The liquid curing agent of claim 21, wherein the liquid curing agent has a melting point $S_m$ of <20° C. at normal pressure.

27. The liquid curing agent of claim 21, wherein the liquid curing agent is liquid at a temperature of 20° C. at normal pressure and has a viscosity of less than 1 Pa*s.

* * * * *